(12) United States Patent
Nomura et al.

(10) Patent No.: US 6,392,828 B1
(45) Date of Patent: May 21, 2002

(54) ZOOM LENS BARREL

(75) Inventors: Hiroshi Nomura, Saitama; Nobuaki Aoki, Tokyo; Takamitsu Sasaki, Saitama; Kazunori Ishizuka, Kanagawa, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 09/695,030

(22) Filed: Oct. 25, 2000

(30) Foreign Application Priority Data

Oct. 27, 1999 (JP) .............................. 11-305223

(51) Int. Cl.$^7$ .......................... G02B 7/02; G02B 15/14; G02B 17/00
(52) U.S. Cl. ...................... 359/827; 359/700; 359/701; 359/826; 396/87; 396/79
(58) Field of Search ................................ 359/699, 700, 359/701, 822, 826, 694, 827; 396/79, 80, 75, 87, 106

(56) References Cited

U.S. PATENT DOCUMENTS

| | | | |
|---|---|---|---|
| 5,270,868 A | * 12/1993 | Nomura | 359/700 |
| 5,488,513 A | 1/1996 | Tanaka | 359/699 |
| 5,589,987 A | 12/1996 | Tanaka | 359/701 |
| 5,708,533 A | 1/1998 | Hamasaki | 359/700 |
| 5,793,537 A | * 8/1998 | Nomura et al. | 359/700 |
| 5,912,772 A | 6/1999 | Aoki | 359/701 |
| 5,991,097 A | * 11/1999 | Nomura et al. | 359/700 |
| 5,995,764 A | * 11/1999 | Azegami et al. | 396/87 |

* cited by examiner

Primary Examiner—Loha Ben
(74) Attorney, Agent, or Firm—Greenblum & Bernstein, P.L.C.

(57) ABSTRACT

A zoom lens barrel includes a cylindrical member which is provided with a female helicoid; a split helicoid cylinder having a rear helicoid ring portion which is provided with a male helicoid which is screw-engaged with the female helicoid, and a front cylindrical portion which is detachably connected to the rear helicoid ring portion so as not to relatively rotate; a linear movement cylinder provided in the split helicoid cylinder so as to move in the optical axis direction; and a connecting structure for connecting the linear movement cylinder to the split helicoid cylinder so as to relatively rotate and so as not to relatively move in the optical axis direction, so that the rear helicoid ring portion and the front cylindrical portion of the split helicoid cylinder maintain connected by the connecting structure without being disconnected in the optical axis direction.

10 Claims, 5 Drawing Sheets

ZOOM LENS BARREL

BACKGROUND OF THE INVENTION

1. Field of the Invention

The present invention relates to a zoom lens barrel.

2. Description of the Related Art

In a known cylinder with a helicoid (helicoid cylinder) which constitutes a zoom lens barrel for a zoom compact camera or the like, a male helicoid is provided on an outer peripheral surface of a rear end of the cylinder in the optical axis direction. The portion of the cylinder in front of the male helicoid has a smooth cylindrical surface. Consequently, the front cylindrical portion is projected forward and exposed externally, in accordance with the feed operation by the helicoid. In such a helicoid cylinder, there is a possibility of the cylindrical portion exposed to the outside being damaged or deformed. Upon replacement of the exposed cylindrical portion, it is necessary to disassemble the mechanical portion as far as the helicoid, thus resulting in an inefficient repair operation. Moreover, the number of the elements that need to be replaced is uneconomically excessive.

SUMMARY OF THE INVENTION

It is an object of the present invention to provide a simple zoom lens barrel which can be easily disassembled.

To achieve the object mentioned above, according to an aspect of the present invention, a zoom lens barrel is provided, including a cylindrical member which is provided on the inner peripheral surface thereof with a female helicoid; a split helicoid cylinder including a rear helicoid ring portion which is provided on the outer peripheral surface thereof with a male helicoid which is screw-engaged with the female helicoid, and a front cylindrical portion separate from the rear helicoid ring portion, which is detachably connected to a front end of the rear helicoid ring portion in the optical axis direction so as not to relatively rotate, wherein the split helicoid cylinder is moved in the optical axis direction while being rotated; a linear movement cylinder which is disposed in the split helicoid cylinder so as to move in the optical axis direction; and a connecting structure for connecting the linear movement cylinder to the split helicoid cylinder so as to relatively rotate and so as not to relatively move in the optical axis direction, so that the rear helicoid ring portion and the front cylindrical portion of the split helicoid cylinder are maintained in a connected state by the connecting structure without being disconnected from one another in the optical axis direction.

In this zoom lens barrel, the helicoid cylinder can be split into the front cylindrical portion and the helicoid ring portion. The front cylindrical portion and the helicoid ring portion are integrally connected by attaching the linear movement cylinder thereto. Thus, the assembling and disassembling operations of the zoom lens barrel can be simplified.

According to another aspect of the present invention, a barrel assembly used in a zoom lens barrel is provided, including a cylindrical member which is provided on the inner peripheral surface thereof with a female helicoid; a split helicoid cylinder including a rear helicoid ring portion which is provided on the outer peripheral surface thereof with a male helicoid which is screw-engaged with the female helicoid, and a front cylindrical portion separate from the rear helicoid ring portion, which is detachably connected to a front end of the rear helicoid ring portion in the optical axis direction so as not to relatively rotate, the split helicoid cylinder being moved in the optical axis direction while being rotated; a linear movement cylinder which is disposed in the split helicoid cylinder so as to move in the optical axis direction; and a connecting structure for connecting the linear movement cylinder to the split helicoid cylinder so as to relatively rotate and so as not to relatively move in the optical axis direction, so that the rear helicoid ring portion and the front cylindrical portion of the split helicoid cylinder are maintained in a connected state by the connecting structure without being disconnected from one another in the optical axis direction.

Preferably, the connecting structure includes at least one circumferential groove centered about the optical axis provided on each inner peripheral surface of the front cylindrical portion and the rear helicoid ring portion, and a plurality of engagement pawls which are provided on the outer peripheral surface of the linear movement cylinder at different positions in the optical axis direction, wherein at least two engagement pawls of the plurality of engagement pawls include an engagement pawl which is engaged with the rear helicoid portion and an engagement pawl which is engaged with the front cylindrical portion. Each of the plurality of engagement pawls is engaged in each corresponding circumferential groove of the front cylindrical portion and the rear helicoid ring portion, respectively, so as to slide in the circumferential direction and so as not to relatively move in the optical axis direction.

Preferably, the engagement pawl which is engaged with the rear helicoid portion is located at a different position in the circumferential direction with respect to the engagement pawl which is engaged with the front cylindrical portion.

Preferably, the front cylindrical portion and the rear helicoid ring portion are provided on the inner peripheral surfaces thereof with pawl engagement/disengagement grooves which extend from the rear end of the rear helicoid ring portion to the frontmost circumferential groove of the front cylindrical portion in parallel with the optical axis when the front cylindrical portion is connected to the rear helicoid ring portion, so that the engagement pawls can be disengageably engaged in the circumferential grooves in the optical axis direction at a specific relative angular position between the split helicoid cylinder and the linear movement cylinder. Consequently, it is possible to engage or disengage only the front cylindrical portion in the optical axis direction at a specific angular position of the split helicoid cylinder, thus resulting in easy assembling and disassembling operations.

Preferably, each of the front end of the rear helicoid ring portion and the rear end of the front cylindrical portion is provided with one of a projection and a recess, and a corresponding other of the projection and the recess, wherein the projection and the recess engage with each other by a predetermined engagement length in the optical axis direction to restrict a relative rotation between the front cylindrical portion and the rear helicoid ring portion.

The present disclosure relates to subject matter contained in Japanese Patent Application No.11-305223 (filed on Oct. 27, 1999) which is expressly incorporated herein by reference in its entirety.

BRIEF DESCRIPTION OF THE DRAWINGS

The invention will be discussed below in detail with reference to the drawings, in which.

DESCRIPTION OF THE PREFERRED EMBODIMENT

A zoom lens barrel 10 is provided on a camera body of a zoom compact camera (not shown). The zooming operation is carried out by varying a distance between a first lens group L1 and a second lens group L2 and a distance of the lens groups from a film surface. The focusing operation is carried out by moving the first lens group L1 in the direction of the optical axis O. Looking at FIGS. 1 and 2, the structure and operation of the zoom lens barrel 10 will be generally discussed below. Note that in the following discussion, the optical axis direction refers to a direction parallel to the photographing optical axis, and the circumferential direction refers to a circumferential direction about the photographing optical axis.

Figure 1:
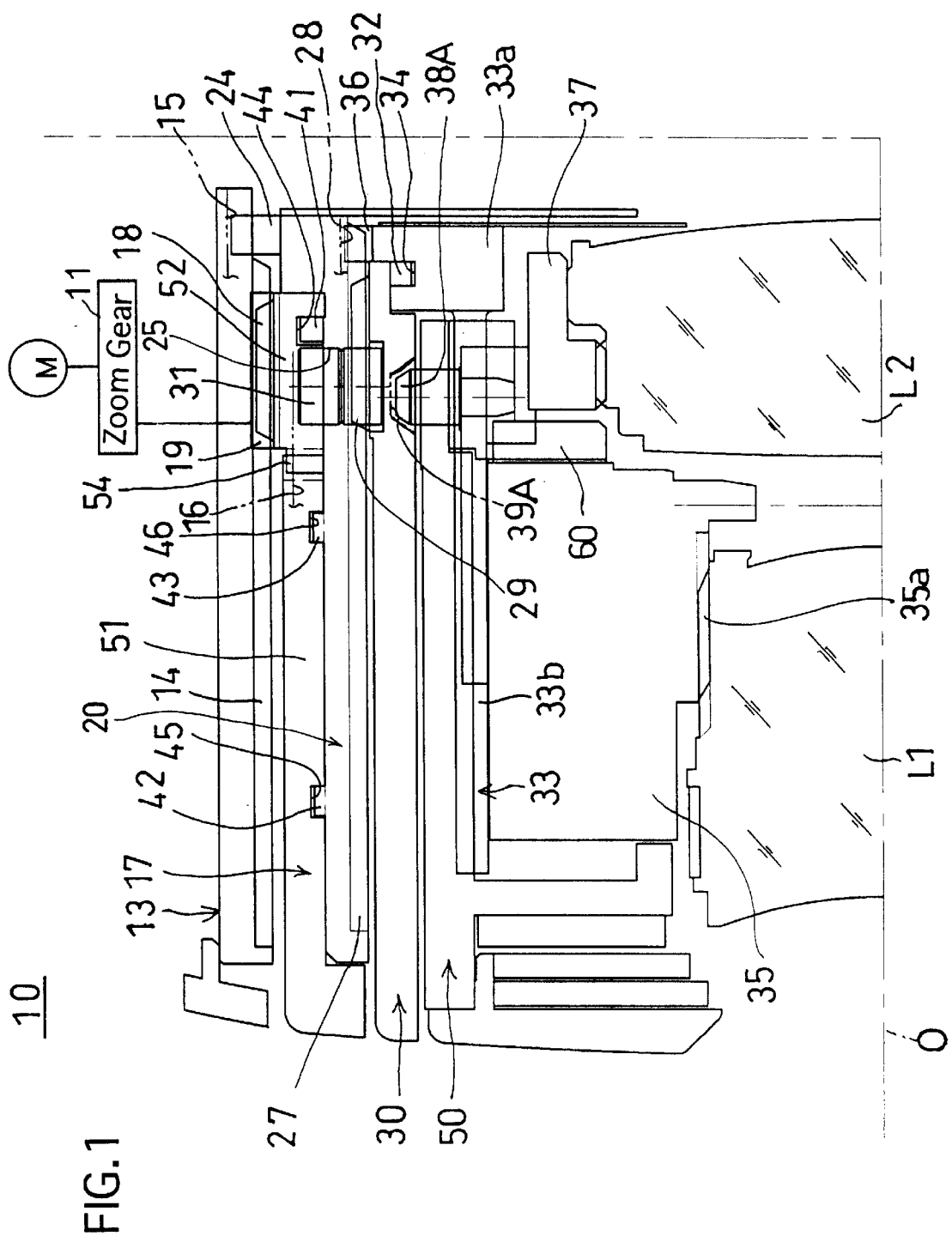
FIG. 1 is a longitudinal sectional view of a zoom lens barrel in a retracted position, according to an embodiment of the present invention.
Figure 2:
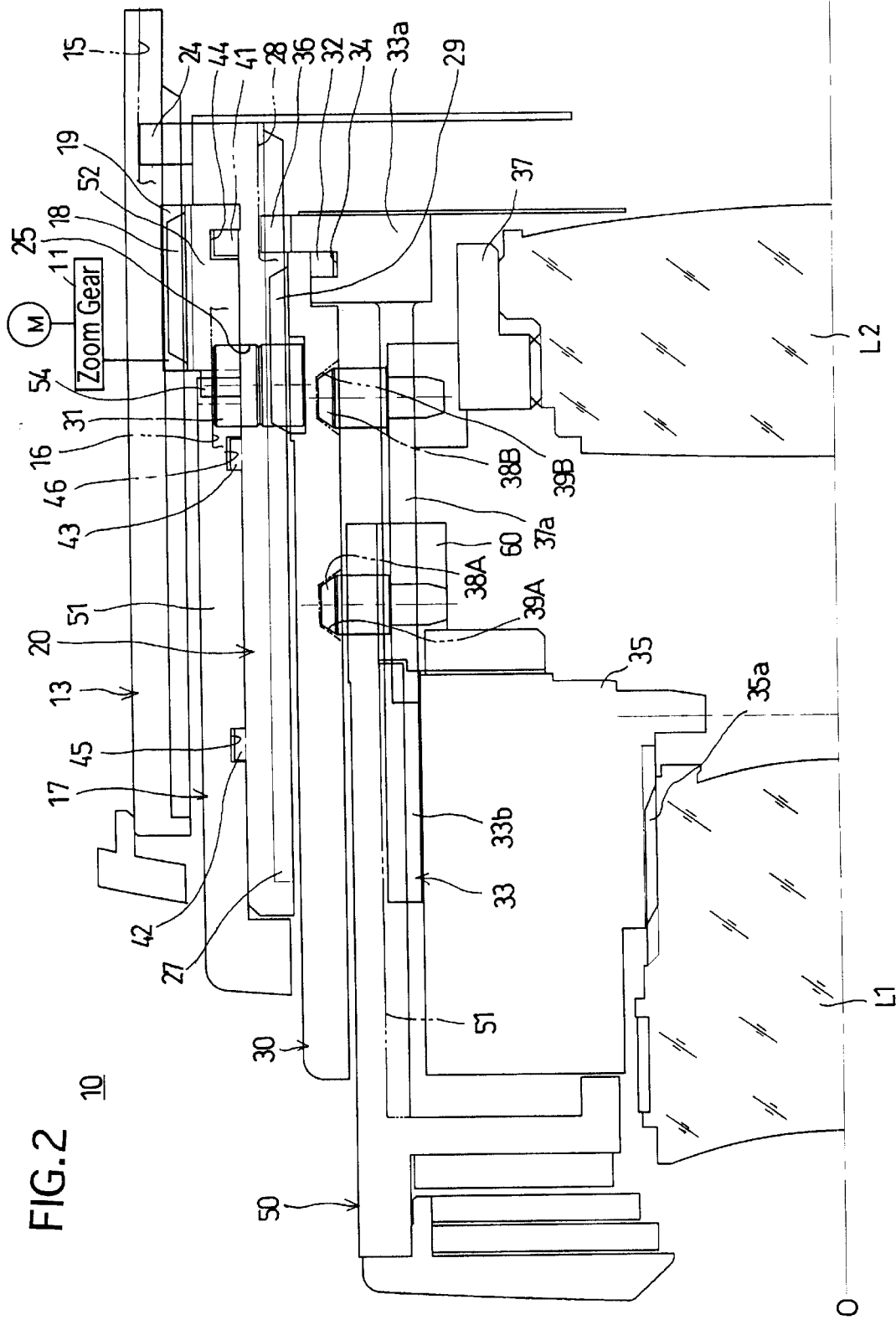
FIG. 2 is a longitudinal sectional view of a zoom lens barrel which is extended to a wide-angle extremity, according to an embodiment of the present invention.

A stationary barrel (cylindrical member) 13 is secured to a camera body (not shown). The stationary barrel 13 is provided on its inner surface with a female helicoid 14 and linear movement guide grooves 15 extending in parallel with the optical axis O. A plurality of linear movement guide grooves 15 are provided at circumferentially different positions on the stationary barrel 13; only one of them is shown in FIGS. 1 and 2. Note that the stationary barrel 13 is provided with a cut-away portion (not shown) elongated in a direction parallel with the optical axis O, so that a tooth surface of a zoom gear 11 is exposed inwardly through the cut-away portion. The zoom gear 11 is rotated about an axis parallel with the optical axis O by a zoom motor M.

Figure 4:
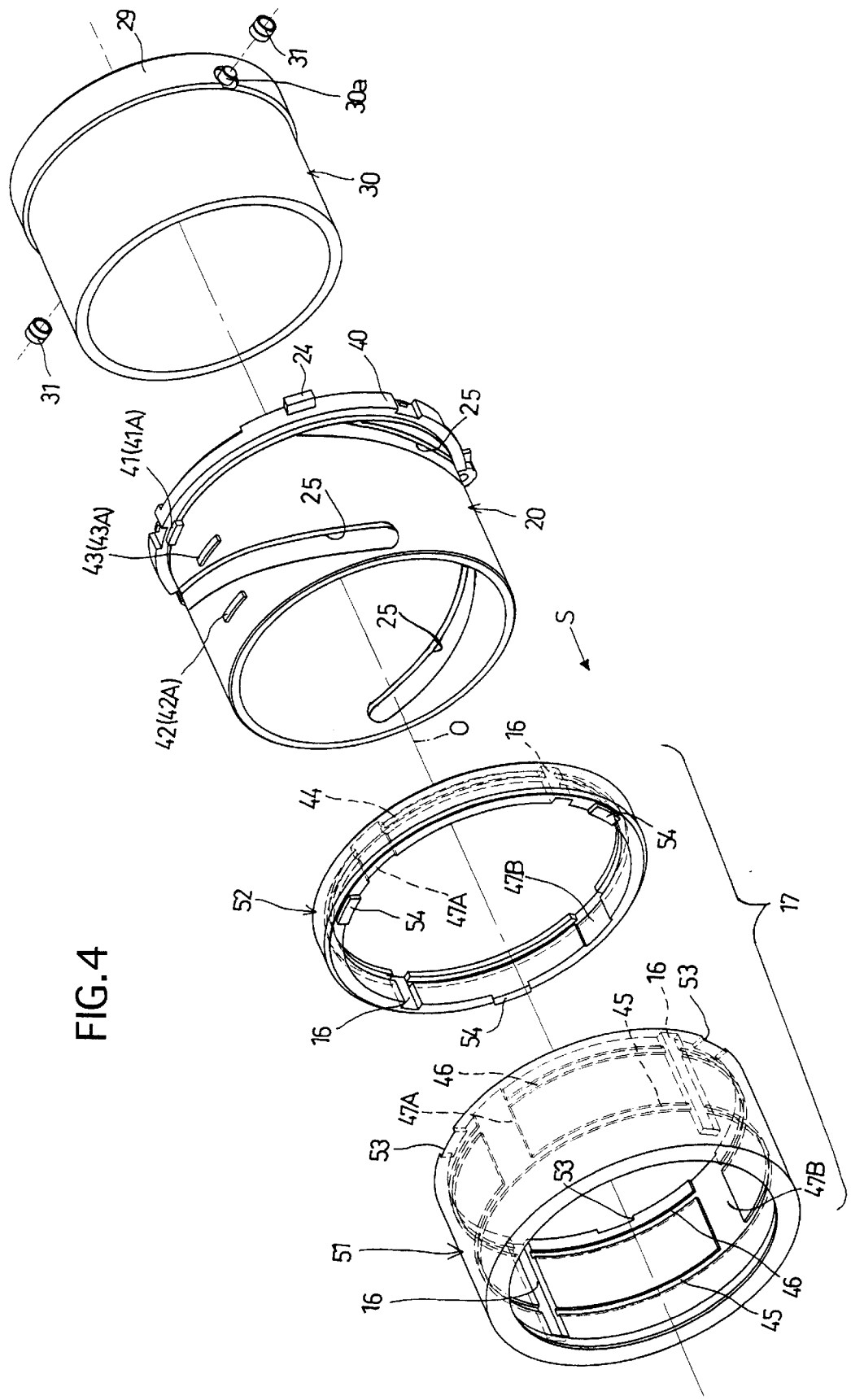
FIG. 4 is an exploded perspective view of a first rotary cylinder which is split into a first cylindrical portion and a helicoid ring portion, a first linear movement cylinder, and a second rotary cylinder, of a zoom lens barrel shown in FIGS. 1 and 2; and, FIG. 5 is a developed view of a first rotary cylinder and a first linear movement cylinder.
Figure 5:
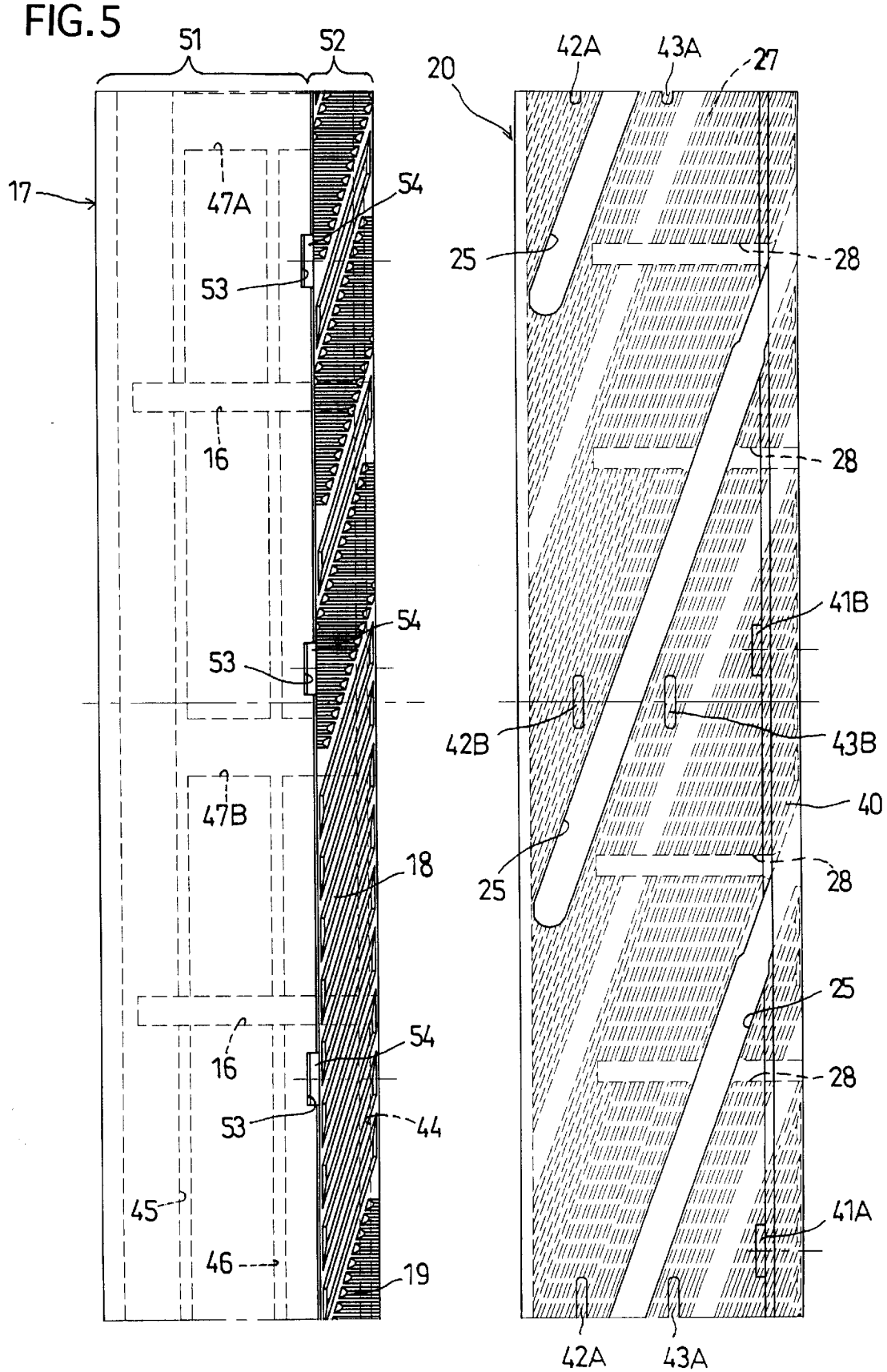

A first rotary cylinder (split helicoid cylinder) 17 is provided in the stationary barrel 13. The first rotary cylinder 17 includes a front cylindrical portion 51 and a helicoid ring portion 52 separate therefrom, as shown in FIG. 5, which will be discussed hereinafter. The female helicoid 14 of the stationary barrel 13 is in mesh with a male helicoid 18 formed on the outer surface of the helicoid ring portion 52. The thread of the male helicoid 18 of the first rotary cylinder 17 is partly widened so that an outer peripheral gear 19, which is engaged with the zoom gear 11, is provided on the wide thread. As can be seen in FIG. 5, the teeth of the outer peripheral gear 19 are parallel with the optical axis O. The first rotary cylinder 17 is provided on its inner surface with a pair of linear cam grooves 16 which are arranged substantially symmetrically with respect to the optical axis O. The linear cam grooves 16 extend in parallel with the optical axis and have bottoms. As shown in FIG. 4, each linear cam groove 16 extends over the front cylindrical portion 51 and the helicoid ring portion 52, so that when the front cylindrical portion 51 is connected to the helicoid ring portion 52, the linear cam grooves 16 on the front cylindrical portion and the helicoid ring portion are continuously connected. The linear cam grooves 16 open at the rear ends thereof into the rear end face of the first rotary cylinder 17.

A first linear movement cylinder 20 is provided in the first rotary cylinder 17. The first linear movement cylinder 20 is connected to the first rotary cylinder 17 so as to relatively rotate about the optical axis O and so as not to relatively move in the optical axis direction. The first linear movement cylinder 20 is provided, on its rear end of the outer peripheral surface, with radially and outwardly extending linear movement guide projections 24 (only one of which is shown in FIGS. 1, 2 and 4) that are spaced from one another in the circumferential direction at a predetermined distance. The linear movement guide projections 24 are slidably engaged in the linear movement guide groove 15 formed on the inner surface of the stationary barrel 13. Consequently, the first linear movement cylinder 20 is movable together with the first rotary cylinder 17 in the optical axis direction and is not rotatable relative to the stationary barrel 13 in the circumferential direction about the optical axis O. Namely, the first linear movement cylinder 20 is guided so as to linearly move along the optical axis O.

The first rotary cylinder 17 and the first linear movement cylinder 20 constitute a first feed stage of the zoom lens barrel 10. In the first feed stage, when the zoom gear 11 is rotated by the zoom motor M in a predetermined barrel feed direction, the first rotary cylinder 17 is rotated through the outer peripheral gears 19, so that the first rotary cylinder 17 is moved (extended) forward from the stationary barrel 13 while being rotated, through the engagement of the female helicoid 14 and the male helicoid 18. When the first rotary cylinder 17 is extended to the maximum position from the stationary barrel 13, only the front cylindrical portion 51 appears externally, and the helicoid ring portion 52 having the male helicoid 18 and the outer gear 19 is not exposed to the outside of the camera. At the same time, the first linear movement cylinder 20 which is supported to rotate relative to the first rotary cylinder 17 is moved in the optical axis directions together with the first rotary cylinder 17 while being guided to linearly move relative to the stationary barrel 13. Note that the zoom gear 11 is made of multiple pinions elongated in the optical axis direction, so that the outer peripheral gears 19 are not disengaged from the zoom gear 11 when the first rotary cylinder 17 is advanced forward (outward).

The first linear movement cylinder 20 is provided on its inner surface with a female helicoid 27 whose direction is the same as that of the female helicoid 14. The first linear movement cylinder 20 is also provided on its inner surface with linear movement guide grooves 28 which extend in parallel with respect to the optical axis O and which are spaced from one another at a predetermined distance in the circumferential direction. The linear movement guide grooves 28 are located at circumferentially different positions on the first linear movement cylinder 20. Only one of the linear movement guide grooves 28 is shown in FIGS. 1 and 2.

Also, the first linear movement cylinder 20 is provided with two through grooves 25 that extend through the thickness of the cylinder from the outer peripheral surface to the inner peripheral surface. As shown in FIG. 5, the two through groove 25 are parallel to be substantially parallel with the threads of the female helicoid 27 and are inclined with respect to the optical axis O.

Figure 3:
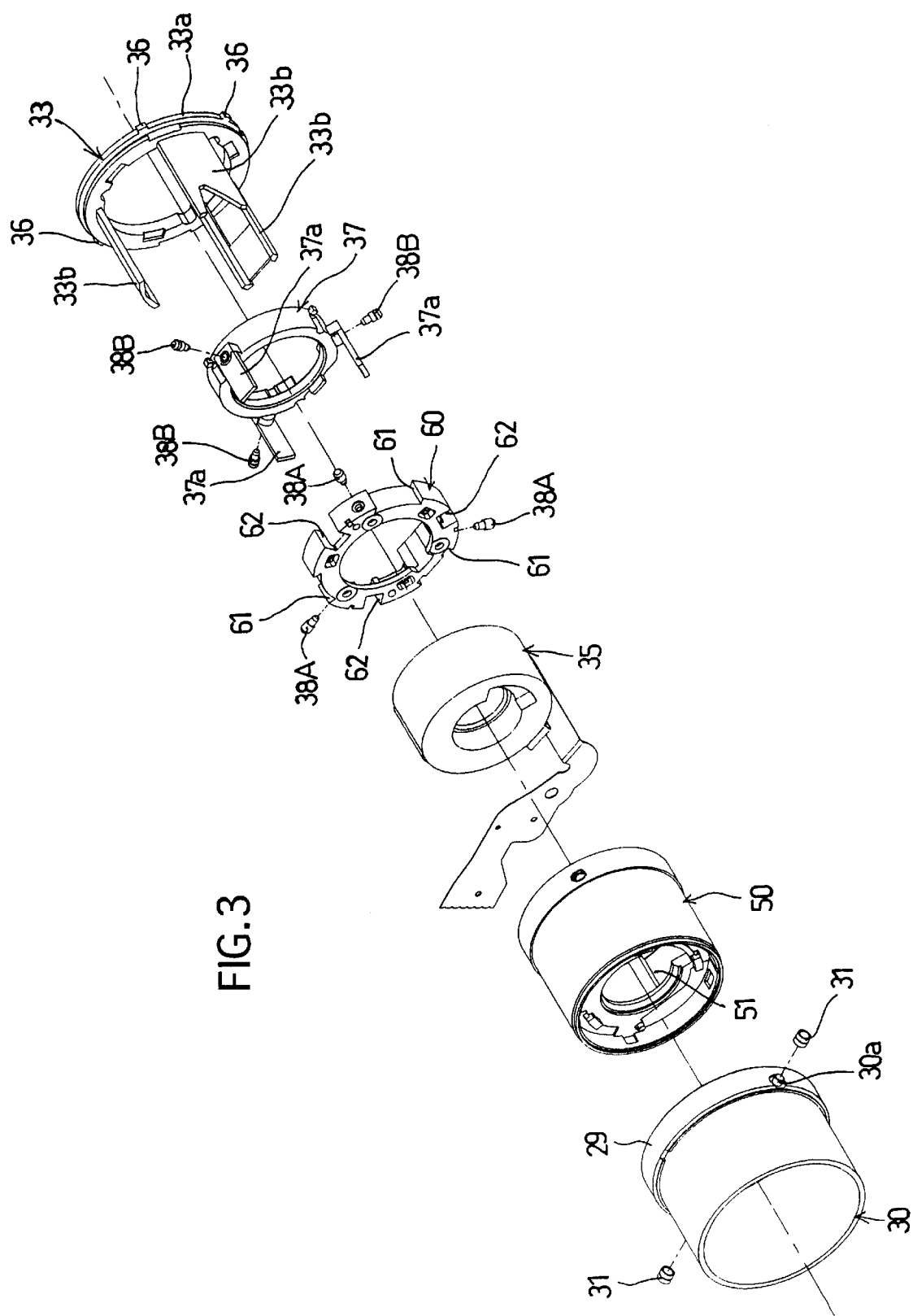
FIG. 3 is an exploded perspective view of elements located inside a second rotary cylinder of a zoom lens barrel shown in FIGS. 1 and 2.

A second rotary cylinder 30 which is provided on its outer peripheral surface with a male helicoid 29 which is in mesh with the female helicoid 27 is provided within the first linear movement cylinder 20. The male helicoid 29 is provided on the outer peripheral surface of the rear end of the second rotary cylinder 30. As shown in FIG. 4, the second rotary cylinder 30 is provided on the outer peripheral surface of the rear end thereof with a pair of support pins 30*a* (only one of which is shown in FIGS. 3 and 4) that extend through cut-away portions of the male helicoid 29. A pair of cam projections 31 are mounted to the support pins 30*a*. The cam projections 31 extend through the through grooves 25 formed in the first linear movement cylinder 20 and are engaged, at the front ends, in axially extending linear cam grooves 16 formed on the inner surface of the first rotary cylinder 17. Consequently, when the first rotary cylinder 17 is rotated by the zoom motor M, the rotational force is transmitted to the second rotary cylinder 30 through the cam projections 31 that engage with the linear cam grooves 16. As a result, the second rotary cylinder 30 is moved forward (fed) from the first linear movement cylinder 20 while being rotated in the same direction as the first rotary cylinder 17, through the engagement between the male helicoid 29 and the female helicoid 27. Since the cam projections 31 extend through the through-grooves 25 parallel with the female helicoid 27, the cam projections 31 are moved in the through grooves 25 in accordance with the feed operation. Conversely, when the first rotary cylinder 17 is rotated in the retracted position, the second rotary cylinder 30 is moved into the first linear movement cylinder 20 while rotating in the same direction as the first rotary cylinder 17.

A second linear movement cylinder 33 is provided within the second rotary cylinder 30. The second linear movement cylinder 33 includes a flange portion 33*a* on the rear end side, and three linear movement guide portions 33*b* in front of the flange portion 33*a* in the optical axis direction. An annular groove 34 whose center is located on the optical axis O is formed on the outer peripheral surface of the flange portion 33*a*. The second rotary cylinder 30 is provided on its inner surface with engagement pawls 32 that are fitted in the annular groove 34, so as not to relatively move in the optical axis direction O but so as to relatively rotate. The engagement pawls can be disengaged only at a specific angular position.

The second linear movement cylinder 33 is provided on the outer surface of the rear end thereof with a plurality of radially extending linear movement guide projections 36 at different circumferential positions. The linear movement guide projections 36 are slidably engaged in the linear movement guide grooves 28 formed on the inner peripheral surface of the first linear movement cylinder 20. Consequently, the second linear movement cylinder 33 is linearly guided by the first linear movement cylinder 20.

The second rotary cylinder 30 and the second linear movement cylinder 33 constitute a second feed stage of the zoom lens barrel 10. As mentioned above, when the first rotary cylinder 17 which constitutes the first feed stage is rotated to move the same forward from the first rotary cylinder 17, the second rotary cylinder 30 is advanced from the first linear movement cylinder 20 while rotating in the same direction as the first rotary cylinder 17 with respect to the stationary barrel 13. At the same time, the second linear movement cylinder 33, which is connected to the second rotary cylinder 30 so as only to relatively rotate, is linearly guided by the first linear movement cylinder 20 and is moved along the optical axis O together with the second rotary cylinder 30 in accordance with the relationship between the linear movement guide projections 36 and the linear movement guide grooves 28.

A third linear movement cylinder 50 is provided between the second rotary cylinder 30 and the second linear movement cylinder 33. The third linear movement cylinder 50 is provided with an entirely circular cylindrical surface which defines an outer appearance of the lens barrel 10, unlike the second linear movement cylinder 33 which is a partially circular cylinder. The third linear movement cylinder 50 is;provided therein with a shutter block 35 secured thereto through a linear movement guide ring 60. The first lens group L1 is supported by the shutter block 35 through a focusing helicoid 35*a*, so that when a focusing motor (not shown) incorporated in the shutter block 35 is driven, the first lens group L1 is moved in the direction of the optical axis O while rotating, in accordance with the focusing helicoid 35*a*, to carry out the focusing operation.

The linear movement guide ring 60 is secured to the rear end of the shutter block 35. The linear movement guide ring 60 is provided with three first linear movement guide groves 61 and three second linear movement guide grooves 62, which are arranged alternately in the circumferential direction. The first and second linear movement guide grooves 61 and 62 extend in the optical axis direction. Three linear movement guide portions 33*b* provided on the second linear movement cylinder 33 are fitted in the first linear movement guide grooves 61. Due to the engagement of the linear movement guide portions 33*b* in the corresponding first linear movement guide grooves 61, the third linear movement cylinder 50 (shutter block 35) and the linear movement guide ring 60 are guided to linearly move in the optical axis direction. The third linear movement cylinder 50 is provided on its inner surface with three axially extending interference prevention grooves 51 (only one of which is shown in FIGS. 2 and 3) at circumferential positions corresponding to the first linear movement guide grooves 61. The interference prevention grooves 51 are adapted to prevent the linear movement guide portions 33*b* guided by the linear movement guide ring 60 from interfering with the third linear movement cylinder 50.

Three first rollers 38A are provided on the outer surface of the rear end of the third linear movement cylinder 50 at different circumferential positions. The third linear movement cylinder 50 and the linear movement guide ring 60 are partly overlapped at the rear ends thereof. The inner ends of the first rollers 38A in the radial direction extend in the third linear movement cylinder 50 and are inserted in the linear movement guide ring 60 at the overlapped portion to connect the third linear movement cylinder 50 and the linear movement guide ring 60 so as not to move relative to each other in the optical axis direction or in the circumferential direction. The outer ends of the first rollers 38A in the radial direction are slidably fitted in first lens group guide grooves 39A formed on the inner peripheral surface of the second rotary cylinder 30. The first lens group guide grooves 39A are inclined at a predetermined angle with respect to the optical axis O, so that when the second rotary cylinder 30 is rotated, the first rollers 38A are guided by the first lens group guide grooves 39A. Consequently, the third linear movement cylinder 50 which is guided to move linearly through the second linear movement cylinder 33 is moved forward or backward in the optical axis direction with respect to the second feed stage. Namely, the third linear movement cylinder 50 constitutes a third feed stage of the zoom lens barrel 10. The first lens group L1 is moved together with the third linear movement cylinder 50 in the optical axis direction.

Three linear movement guide portions 37*a* provided on a second lens group support frame 37 which supports the second lens group L2 are slidably fitted in the second linear movement guide grooves 62 of the linear movement guide ring 60. Due to the engagement of the linear movement guide portions 37*a* in the second linear movement guide grooves 62, the second lens group support frame 37 is guided to linearly move in the optical axis direction. A second roller 38B protrudes in the radially outward direction from each linear movement guide portion 37a of the second lens group support frame 37. The second rollers 38B are slidably fitted in second lens group guide grooves 39B formed on the inner peripheral surface of the second rotary cylinder 30. The second lens group guide grooves 39B are inclined at a predetermined angle with respect to the optical axis O, so that when the second rotary cylinder 30 is rotated, the second rollers 38B are guided by the second lens group guide grooves 39B. Consequently, the rear lens group support frame 37 which is guided to move linearly and the second lens group L2 are moved forward or backward in the optical axis direction within the second linear movement cylinder 33. Note that in FIG. 1, the first rollers 38A and the second rollers 38B are circumferentially overlapped, and hence, only the first rollers 38A are shown.

The zoom lens barrel 10 constructed as above operates as follows. When the zoom motor M is driven in the forward-feed direction, the first rotary cylinder 17 is advanced from the stationary barrel 13 while rotating. As a result, the first linear movement cylinder 20 is moved forward together with the first rotary cylinder 17, while being guided by the stationary barrel 13 to move linearly. Consequently, the second rotary cylinder 30 is moved forward from the first linear movement cylinder 20 while rotating in the same direction as the first rotary cylinder 17. At the same time, the second linear movement guide cylinder 33 is moved linearly in the optical axis direction O together with the second rotary cylinder 30. When the second rotary cylinder 30 is rotated and advanced, the third linear movement cylinder 50 is further moved forward in the optical axis direction together with the first lens group L1, in accordance with the first lens group guide grooves 39A formed on the inner peripheral surface of the second rotary cylinder 30. At the same time, the second lens group L2 which is guided by the second lens group guide grooves 39B is moved in accordance with a predetermined track within the second rotary cylinder 30. Consequently, the first lens group L1 and the second lens group L2 are moved forward in the optical axis direction, while varying the distance therebetween.

When the zoom motor M is rotated in the reverse direction (toward the retracted position), the zoom lens barrel 10 carries out the above-mentioned operations but in the opposite order.

As can be understood from the foregoing, in the zoom lens barrel 10 having three feed-stages, the zooming operation is carried out by the composite operations of the variation of the distance of the first and second lens groups L1 and L2 from the film surface and the relative movement of the first and second lens groups L1 and L2 close to or away from one another. Moreover, the focusing operation is carried out by moving the first lens group L1 in a direction parallel with the optical axis O at each focal length which is varied in accordance with the zooming operation.

The significant constituent features of the present invention will be discussed below. As mentioned above, the first rotary cylinder 17 includes two elements which can be split in the optical axis direction, i.e., the front cylindrical portion 51 and the helicoid ring portion 52. The front cylindrical portion 51 is provided on its rear end face with three engagement recesses 53 which are spaced in the circumferential direction. The helicoid ring portion 52 is provided on its front end face with three engagement projections 54 that are spaced in the circumferential direction, corresponding to the three engagement recesses 53. The engagement projections 54 and the corresponding engagement recesses 53 are engaged without play in the circumferential direction and have a predetermined engagement length (clearance in the optical axis direction) in the optical axis direction. upon assembling of the zoom lens barrel 10, the three projections 54 are fitted in the corresponding three recesses 53, and the front cylindrical portion 51 and the helicoid ring portion 52 are interconnected so as not to be disconnected from one another in the optical axis direction to thereby form the first rotary cylinder 17 via the first linear movement cylinder 20. Conversely, at a specific disengageable angular position, it is possible to remove only the front cylindrical portion 51 from the first linear movement cylinder 20. As can be understood from the foregoing, the helicoid cylinder is split into an externally exposed portion and a helicoid portion, which can be easily disconnected. Consequently, for example, if the front cylindrical portion (externally exposed portion) 51 is damaged, it is possible to exchange only the externally exposed portion.

The first linear movement cylinder 20 is provided on its rear end with a rear end rib 40 whose diameter is larger than that of the body portion of the first linear movement cylinder 20. Also, the first linear movement cylinder 20 is provided on its outer peripheral surface with two rear engagement pawls 41 (41A, 41B) that are located in front of and close to the rear end rib 40, and two front engagement pawls 42 (42A, 42B) adjacent to the front end thereof in the optical axis direction and two intermediate engagement pawls 43 (43A, 43B). The engagement pawls 41A and 41B, 42A and 42B, and 43A and 43B are respectively spaced at an equal distance in the circumferential direction. The front engagement pawl 42A and the intermediate engagement pawl 43A are located on a common line in the optical axis direction, and the front engagement pawl 42B and the intermediate engagement pawl 43B are located on a common line in the optical axis direction. The rear engagement pawl 41A and the rear engagement pawl 41B are located at positions slightly different from the front engagement pawls 42 and the intermediate engagement pawls 43, in the circumferential direction. As can be seen in FIGS. 4 and 5, the rear and intermediate engagement pawls 41 and 43 are located in the rear of the through groove 25 in the optical axis direction, and the front engagement pawls 42 are located in front of the through groove 25 in the optical axis direction. The engagement pawls 41, 42 and 43 are identical in the length in the circumferential direction. The circumferential length of the engagement pawls 41, 42 and 43 is larger than the circumferential width of the linear cam grooves 16 formed on the inner surface of the first rotary cylinder 17.

The helicoid ring portion 52 which constitutes part of the first rotary cylinder 17 is provided on its inner peripheral surface with a rear annular groove (circumferential groove) 44. The front cylindrical portion 51 is provided with a front annular groove (circumferential groove) 45 and an intermediate annular groove (circumferential groove) 46 at different positions along the optical axis O. The annular grooves 44, 45 and 46 have bottoms and are formed in parallel with respect to each other in a direction perpendicular to the optical axis O. The axial distance between the rear and intermediate annular grooves 44 and 46 corresponds to the axial distance between the rear and intermediate engagement pawls 41 and 43 of the first linear movement cylinder 20. Likewise, the axial distance between the intermediate and front annular grooves 46 and 45 corresponds to the axial distance between the intermediate and front engagement pawls 43 and 42.

The widths of the engagement pawls 41, 42 and 43 in the optical axis direction are such that the engagement pawls cannot be moved in the optical axis direction but can be slid in the circumferential direction relative to the rear annular grooves 44, 45 and 46, respectively. Furthermore, since the first rotary cylinder 17 and the first linear movement cylinder 20 are connected through the engagement between the annular grooves 44, 45 and 46, and the engagement pawls 41, 42 and 43, respectively, a firmer and more reliable connection can be achieved than in the case where connection is established only at the rear ends thereof.

The first rotary cylinder 17 is provided on its inner peripheral surface with two pawl engagement/disengagement grooves 47A and 47B which have bottoms and extend from the front annular groove 45 to the rear end of the helicoid ring portion 52 via the intermediate annular groove 46 and the rear annular groove 44 in the optical axis direction O. As shown in FIG. 4, the pawl engagement/disengagement grooves 47A and 47B extend over the front cylindrical portion 51 and the helicoid ring portion 52, so that when the front cylindrical portion 51 and the helicoid ring portion 52 are assembled, a continuous pawl engagement/disengagement groove is formed. The rear ends of the pawl engagement/disengagement grooves 47A and 47B open into the rear end face of the helicoid ring portion 52.

The pawl engagement/disengagement grooves 47A and 47B in the circumferential direction are spaced at a distance corresponding to the circumferential distance between the engagement pawls 41A and 41B, 42A and 42B, and 43A and 43B. The width of the pawl engagement/disengagement grooves 47A and 47B in the circumferential direction is slightly greater than the length of each engagement pawl in the circumferential direction, so that the engagement pawls can be moved in the optical axis direction within the pawl engagement/disengagement grooves 47A and 47B.

Upon assembling the first rotary cylinder 17 and the first linear movement cylinder 20, the angular positions of the helicoid ring portion 52 and the first linear movement cylinder 20 are registered, and the first linear movement cylinder 20 is inserted in the direction S, shown in FIG. 4, into the helicoid ring portion 52. Consequently, the front engagement pawls 42A, 42B and thereafter the intermediate engagement pawls 43A, 43B enter the pawl engagement/disengagement grooves 47A and 47B, respectively. The insertion operation in the optical axis direction continues until the helicoid ring portion 52 passes through the intermediate pawls 43A, 43B. Thereafter, the first linear movement cylinder 20 and the helicoid ring portion 52 are relatively rotated, so that the pawl engagement/disengagement grooves 47A, 47B of the helicoid ring portion 52 are registered with the rear engagement pawls 41A, 41B, respectively. Further insertion in the optical axis direction causes the rear engagement pawls 41A 41B to enter the pawl engagement/disengagement grooves 47A, 47B of the helicoid ring portion 52.

Since the rear end rib 40 is provided in rear of the rear engagement pawls 41A, 41B, the rear end face of the helicoid ring portion 52 abuts against the rear end rib 40 immediately after the rear engagement pawls 41A and 41B enter the pawl engagement/disengagement grooves 47A and 47B of the helicoid ring portion 52. Thus, no further insertion is permitted.

In this position, the pair of rear engagement pawls 41 (41A, 41B) correspond to the rear annular groove 44, so that the first linear movement cylinder 20 and the helicoid ring portion 52 can be relatively rotated wherein the rear engagement pawls 41 are moved into the rear annular grooves 44.

The helicoid ring portion 52 and the first linear movement cylinder 20 are relatively rotated to and held in an angular position in which the circumferential positions of the pawl engagement/disengagement grooves 47A and 47B correspond to the front engagement pawls 42A, 42B and the intermediate engagement pawls 43A, 43B, respectively. In this position, the helicoid ring portion 52 and the first linear movement cylinder 20 are interconnected so as not to relatively move in the optical axis direction due to the engagement of the rear engagement pawls 41A, 41B and the rear annular groove 44.

Thereafter, the first linear movement cylinder 20 is inserted in the direction S into the front cylindrical portion 51. Alternatively, it is possible to insert the front cylindrical portion 51 in a direction opposite to the direction S. Upon insertion, as in the helicoid ring portion 52, the angular positions of the front cylindrical portion 51 and the first linear movement cylinder 20 are registered, so that the positions of the pawl engagement/disengagement grooves 47A, 47B correspond to the front engagement pawls 42A, 42B, respectively. When the insertion in the optical axis direction by a predetermined length is carried out, the rear end of the front cylindrical portion 51 abuts against the front end of the helicoid ring portion 52, so that further insertion is restricted. Consequently, the three front engagement recesses 53 of the front cylindrical portion 51 are engaged by the projections 54 of the helicoid ring portion 52. No relative rotation in the circumferential direction between the front cylindrical portion 51 and the helicoid ring portion 52 is permitted due to the engagement of the projections 54 in the corresponding recesses 53. Moreover, when the engagement occurs, each of a pair of pawl engagement/disengagement grooves 47A, 47B formed on the front cylindrical portion 51 and the helicoid ring portion 52 continuously extends over the front cylindrical portion 51 and the helicoid ring portion 52. Likewise, each of a pair of linear grooves 16 formed on the front cylindrical portion 51 and the helicoid ring portion 52 extends continuously.

When the connection of the front cylindrical portion 51 and the helicoid ring portion 52 is established, the pair of front engagement pawls 42 (42A, 42B) correspond to the front annular groove 45, and the pair of rear engagement pawls 43 (43A, 43b) correspond to the intermediate annular groove 46. As mentioned above, the pair of rear engagement pawls 41 (41A, 41B) are held in the rear annular groove 44 when the insertion of the helicoid ring portion 52 is completed. Therefore, the first rotary cylinder 17 (the front cylindrical portion 51 and the helicoid ring portion 52 in combination) and the first linear movement cylinder 20 can be relatively rotated by guiding the engagement pawls 41, 42 and 43 in the corresponding annular grooves 44, 45 and 46. If a slight rotation of the first rotary cylinder 17 takes place at the disengageable position of the front cylindrical portion 51, the engagement pawls are disengaged from the pawl engagement/disengagement grooves 47A, 47B and enter the corresponding annular grooves, so that the helicoid ring portion 52, the front cylindrical portion 51 and the first linear movement cylinder 20 are connected so as not to relatively move in the optical axis direction.

Since the axial distance between the engagement pawls 41, 42 and 43 of the first linear movement cylinder 20 is constant, the front cylindrical portion 51 having the front and intermediate annular grooves 45 and 46 which are engaged by the front and intermediate engagement pawls 42 and 43 is connected to the helicoid annular portion 52 having the rear engagement groove 44 which is engaged by the rear engagement pawls 41 through the first linear movement cylinder 20 so as not to relatively move in the optical axis direction. In this position, the engagement projections 54 are fitted in the engagement recesses 53, and hence, no relative rotation of the front cylindrical portion 51 and the helicoid ring portion 52 in the circumferential direction occurs. Namely, the first rotary cylinder 17 forms an integral helicoid barrel. The first rotary cylinder 17 and the first linear movement cylinder 20 are interconnected to be relatively rotatable about the optical axis O and so as not to be relatively movable in the optical axis direction. The assembling operation of the first rotary cylinder 17 and the first linear movement cylinder 20 can be carried out only by fitting the engagement pawls 41 through 43 in the annular grooves 44 through 46 and fitting the engagement projections 53 in the engagement recesses 54 without using a securing means such as an adhesive.

Since there is a slight clearance in the optical axis direction between the engagement projections 53 and the engagement recesses 54 as mentioned above, even if there is a slight positional deviation between the engagement pawls 42 and 43 to be,engaged by the front cylindrical portion 51 and the engagement pawls 41 to be engaged by the helicoid ring portion 52, the distance in the optical axis direction between the front cylindrical portion 51 and the helicoid ring portion 52 can be adjusted accordingly to make the axial positions of the annular grooves 44 through 46 coincident with the engagement pawls 41 through 43.

In the assembling operation mentioned above, it is possible to incorporate the second rotary cylinder 30 in the first linear movement cylinder 20 before the first rotary cylinder 17 and the first linear movement cylinder 20 are assembled. The second rotary cylinder 30 is provided with a pair of cam projections 31, so that when the second rotary cylinder 30 is inserted in the first linear movement cylinder 20, the pair of cam projections 31 extend through the corresponding through grooves 25, with the front ends protruding outward in the radial directions. Thereafter, as mentioned above, the angular position of the second rotary cylinder 30 in the first linear movement cylinder 20 is registered, so that the positions of the pair of the cam projections 31 correspond to the pair of linear cam grooves 16, when the helicoid ring portion 52 and the front cylindrical portion 51 are successively slid and connected to the first linear movement cylinder 20. Consequently, the cam projections 31 which radially and outwardly protrude are fitted in the corresponding linear cam grooves 16 in accordance with the insertion in the optical axis direction.

The rear annular groove 44, the front annular groove 45 and the intermediate annular groove 46 intersect the linear cam grooves 16 which guide the cam projections 31, so that when the engagement pawls 41 through 43 are slid in the annular grooves 44 through 46, the engagement pawls 41 through 43 pass through the intersection of the linear cam grooves 16. However, as mentioned above, since the length of the engagement pawls 41 through 43 in the circumferential direction is larger than the width of the linear cam grooves 16 in the circumferential direction, no disengagement of the engagement pawls 41 through 43 from the annular grooves 44 through 46 in the linear cam grooves 16 occurs during the relative rotation of the first rotary cylinder 17 and the first linear movement cylinder 20.

The disassembling operation is carried out in the order opposite to the above-mentioned assembling operation. Namely, the first rotary cylinder 17 and the first linear movement cylinder 20 are relatively rotated to an angular position in which the front engagement pawl 42A and the intermediate engagement pawl 43A are located within the pawl engagement/disengagement groove 47A, and the front engagement pawl 42B and the intermediate engagement pawl 43B are located within the pawl engagement/disengagement groove 47B. Thereafter, the front cylindrical portion 51 is drawn forward. In this position, since the rear engagement pawls 41A and 41B in the rear annular groove 44 do not correspond to the pawl engagement/disengagement grooves 47A and 47B in the circumferential direction, the connection of the first linear movement cylinder 20 and the helicoid ring portion 52 is maintained. With this structure, the following advantages can be expected.

In an assembly of the zoom lens barrel 10, the male helicoid 18 on the outer peripheral surface of the helicoid ring portion 52 is engaged by the female helicoid 14 of the stationary barrel 13, so that the movement of the helicoid ring portion 52 relative to the stationary barrel 13 in the optical axis direction is restricted. Since the first linear movement cylinder 20 is connected to the helicoid ring portion 52 so as not to move relative to each other in the optical axis direction, due to the engagement of the rear engagement pawls 41 and the rear annular grooves 44, the first linear movement cylinder 20 and the lens groups, etc., located internally with respect to the linear movement cylinder 20 are held by the helicoid ring portion 52 so as not to slip off from the stationary barrel 13. Consequently, it is possible to exchange only the front cylindrical portion 51 without disassembling other elements of the assembly of the zoom lens barrel 10. In the zoom lens barrel 10 according to the illustrated embodiment, as can be seen in FIGS. 1 and 2, since no decorative ring, etc., is provided at the front end of the front cylindrical portion 51, the removal of the front cylindrical portion can be easily carried out.

In addition to the foregoing, if the helicoid ring portion 52 must be disconnected from the first linear movement portion 20, the first linear movement cylinder 20 and the helicoid ring portion 52 are relatively rotated to an angular position in which the rear engagement pawls 41A and 41B are located within the pawl engagement/disengagement grooves 47A and 47B in the order opposite to that of the assembling operation, and thereafter the helicoid ring portion 52 is slightly withdrawn forward (or the first linear movement cylinder 20 is drawn rearward). Thereafter, the helicoid ring portion 52 is rotated, so that the positions of the intermediate engagement pawls 43A and 43B in the circumferential direction correspond to the pawl engagement/disengagement pawls 47A and 47B. Thereafter, the helicoid ring portion 52 and the first linear movement cylinder 20 are slid in the optical axis direction, while the intermediate engagement pawls 43A and 43B and the front engagement pawls 42A and 42B move along the pawl engagement/disengagement grooves 47A and 47B, respectively. As a result, the helicoid ring portion 52 and the first linear movement cylinder 20 are disconnected. In other words, the front cylindrical portion 51 and the helicoid ring portion 52 are detachably attached via the engagement pawls 43, 42 and 41, and the pawl engagement/disengagement grooves 47A, 47B. Furthermore, by providing the engagement pawls 41, 42 and 43, the strength of the zoom lens barrel is increased since the first rotary cylinder 17 is connected with the first linear movement cylinder 20 at three different places with respect to the optical axis O.

As can be understood from the above discussion, in the illustrated embodiment, the first rotary cylinder 17 which forms the helicoid cylinder can be split into the front cylindrical portion 51 and the helicoid ring portion 52. The front cylindrical portion 51 and the helicoid ring portion 52 are made integral by the first linear movement cylinder 20 to which they are connected. Thus, a zoom lens barrel which can be easily assembled and disassembled can be obtained. In particular, the connecting structure between the first rotary cylinder 17 and the first linear movement cylinder 20 includes the annular grooves 44 through 46 provided on the front cylindrical portion 51 and the helicoid ring portion 52, respectively, and the radially extending engagement pawls 41 through 43 which can be engaged in the annular grooves, wherein the engagement of the front cylindrical portion 51 or the helicoid ring portion 52 and the first linear movement cylinder 20 can be released in the optical axis direction at a specific angular position. Consequently, it is possible to withdraw the, front cylindrical portion 51 in the forward direction without disassembling the zoom lens barrel. Thus, the replacement of the elements can be facilitated, in comparison with the prior art.

The present invention is not limited to the illustrated embodiments. For instance, although the two annular grooves 45 and 46 are provided on the front cylindrical portion 51 in the illustrated embodiments, it is necessary for each of the front cylindrical portion 51 and the helicoid ring portion 52 to have at least one annular groove in order to connect the front cylindrical portion 51 and the helicoid ring portion 52 through the first linear movement cylinder 20. Moreover, although the annular grooves 44 through 46 are provided on the first rotary cylinder 17 and the engagement pawls 41 through 43 are provided on the first linear movement cylinder 20, in the illustrated embodiment, it is possible to provide the annular grooves and the engagement pawls on the first linear movement cylinder and the first rotary cylinder, respectively.

In the illustrated embodiments, the rear engagement pawls 41 that are to correspond to the helicoid ring portion 52 are provided in a different circumferential position with respect to the front and intermediate engagement pawls 42 and 43 that correspond to the front cylindrical portion 51. Consequently, the disengageable angular position of the front cylindrical portion 51 is different from the disengageable angular position of the helicoid ring portion 52, so that even after the front cylindrical portion 51 is removed, the connection between the helicoid ring portion 52 and the first linear movement cylinder 20 is advantageously maintained. However, in view of the integral connection of the split helicoid cylinder (first rotary cylinder 17) via the first linear movement cylinder 20 connected thereto, it is alternatively possible to make the circumferential position of all the engagement pawls identical. In this alternative, it is possible to first assemble the front cylindrical portion 51 and the helicoid ring portion 52 together to form a barrel, and thereafter, the barrel is slid in the. optical axis direction to connect the same to the first linear movement cylinder 20.

As can be understood from the above discussion, according to the present invention, a simple zoom lens barrel which can be easily assembled and disassembled can be provided.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens barrel comprising:
   a cylindrical member which is provided on the inner peripheral surface thereof with a female helicoid;
   a split helicoid cylinder comprising a rear helicoid ring portion which is provided on the outer peripheral surface thereof with a male helicoid which is screw-engaged with said female helicoid, and a front cylindrical portion separate from the rear helicoid ring portion, which is detachably connected toga front end of the rear helicoid ring portion in the optical axis direction so as not to relatively rotate, wherein said split helicoid cylinder is moved in the optical axis direction while being rotated;
   a linear movement cylinder which is disposed in the split helicoid cylinder so as to move in the optical axis direction; and
   a connecting structure for connecting the linear movement cylinder to the split helicoid cylinder so as to relatively rotate and so as not to relatively move in the optical axis direction, so that the rear helicoid ring portion and the front cylindrical portion of the split helicoid cylinder are maintained in a connected state by the connecting structure without being disconnected from one another in the optical axis direction.

2. The zoom lens barrel according to claim 1, wherein said connecting structure is comprised of at least one circumferential groove centered about the optical axis provided on each inner peripheral surface of the front cylindrical portion and the rear helicoid ring portion, and a plurality of engagement pawls which are provided on the outer peripheral surface of the linear movement cylinder at different positions in the optical axis direction, wherein at least two engagement pawls of said plurality of engagement pawls comprise an engagement pawl which is engaged with said rear helicoid portion and an engagement pawl which is engaged with said front cylindrical portion; and wherein
   each of said plurality of engagement pawls is engaged in each corresponding circumferential groove of the front cylindrical portion and the rear helicoid ring portion, respectively, so as to slide in the circumferential direction and so as not to relatively move in the optical axis direction.

3. The zoom lens barrel according to claim 2, wherein said engagement pawl which is engaged with said rear helicoid portion is located at a different position in the circumferential direction with respect to said engagement pawl which is engaged with said front cylindrical portion.

4. The zoom lens barrel according to claim 2, wherein said front cylindrical portion and said rear helicoid ring portion are provided on the inner peripheral surfaces thereof with: pawl engagement/disengagement grooves which extend from the rear end of the rear helicoid ring portion to the frontmost circumferential groove of the front cylindrical portion in parallel with the optical axis when the front cylindrical portion is connected to the rear helicoid ring portion, so that said engagement pawls can be disengageably engaged in the circumferential grooves in the optical axis direction at a specific relative angular position between the split helicoid cylinder and the linear movement cylinder.

5. The zoom lens barrel according to claim 1, wherein each of the front end of said rear helicoid ring portion and the rear end of said front cylindrical portion is provided with one of a projection and a recess, and a corresponding other of said projection and said recess, wherein said projection and said recess engage with each other by a predetermined engagement length in the optical axis direction to restrict a relative rotation between the front cylindrical portion and the rear helicoid ring portion.

6. A barrel assembly used in a zoom lens barrel comprising:
   a cylindrical member which is provided on the inner peripheral surface thereof with a female helicoid;

a split helicoid cylinder comprising a rear helicoid ring portion which is provided on the outer peripheral surface thereof with a male helicoid which is screw-engaged with said female helicoid, and a front cylindrical portion separate from the rear helicoid ring portion, which is detachably connected to a front end of the rear helicoid ring portion in the optical axis direction so as not to relatively rotate, said split helicoid cylinder being moved in the optical axis direction while being rotated;

a linear movement cylinder which is disposed in the split helicoid cylinder so as to move in the optical axis direction; and a connecting structure for connecting the linear movement cylinder to the split helicoid cylinder so as to relatively rotate and so as not to relatively move in the optical axis direction, so that the rear helicoid ring portion and the front cylindrical portion of the split helicoid cylinder are maintained in a connected state by the connecting structure without being disconnected from one another in the optical axis direction.

7. The barrel assembly according to claim 6, wherein said connecting structure is comprised of at least one circumferential groove centered about the optical axis, provided on each inner peripheral surface of the front cylindrical portion and the rear helicoid ring portion, and a plurality of engagement pawls which are provided on the outer peripheral surface of the linear movement cylinder at different positions in the optical axis direction, wherein at least two engagement pawls of said plurality of engagement pawls comprise an engagement pawl which is engaged with said rear helicoid portion and an engagement pawl which is engaged with said front cylindrical portion; and wherein each of said plurality of engagement pawls is engaged in each corresponding circumferential groove of the front cylindrical portion and the rear helicoid ring portion, respectively so as to slide in the circumferential direction and so as not to relatively move in the optical axis direction.

8. The barrel assembly according to claim 7, wherein said engagement pawl which is engaged with said rear helicoid portion is located at a different position in the circumferential direction with respect to said engagement pawl which is engaged with said front cylindrical portion.

9. The barrel assembly according to claim 7, wherein said front cylindrical portion and said rear helicoid ring portion are provided on the inner peripheral surfaces thereof with pawl engagement/disengagement grooves which extend from the rear end of the rear helicoid ring portion to the front most circumferential groove of the front cylindrical portion in parallel with the optical axis when the front cylindrical portion is connected to the rear helicoid ring portion, so that said engagement pawls can be disengageably engaged in the circumferential grooves in the optical axis direction at a specific relative angular position between the split helicoid cylinder and the linear movement cylinder.

10. The barrel assembly according to claim 6, wherein each of the front end of said rear helicoid ring portion and the rear end of said front cylindrical portion is provided with one of a projection and a recess, and a corresponding other of said projection and said recess, wherein said projection and said recess engage with each other by a predetermined engagement length in the optical axis direction to restrict a relative rotation between the front cylindrical portion and the rear helicoid ring portion.

* * * * *